Feb. 6, 1951
P. C. TABBERT
2,540,767
ROTARY PUMP
Filed June 29, 1945
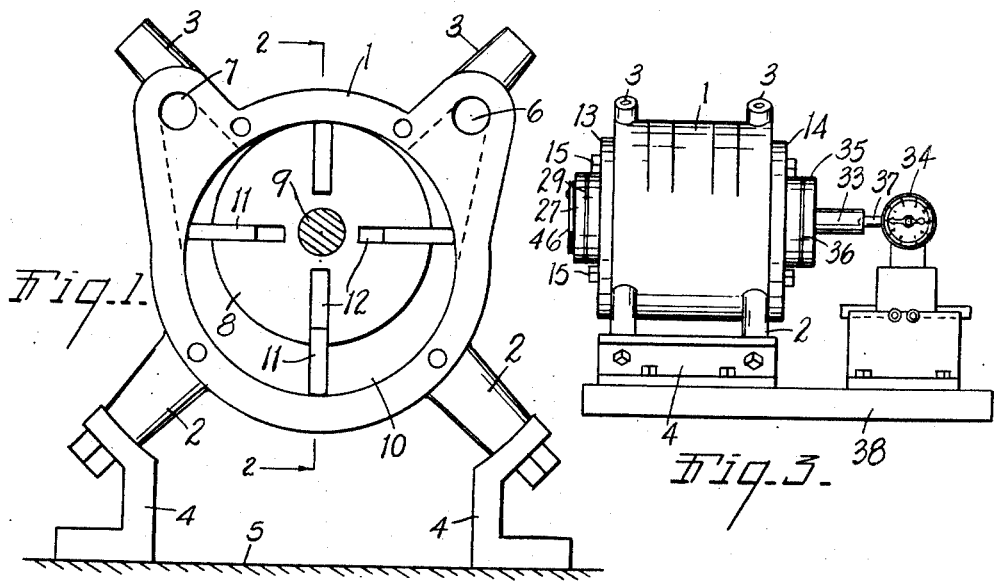
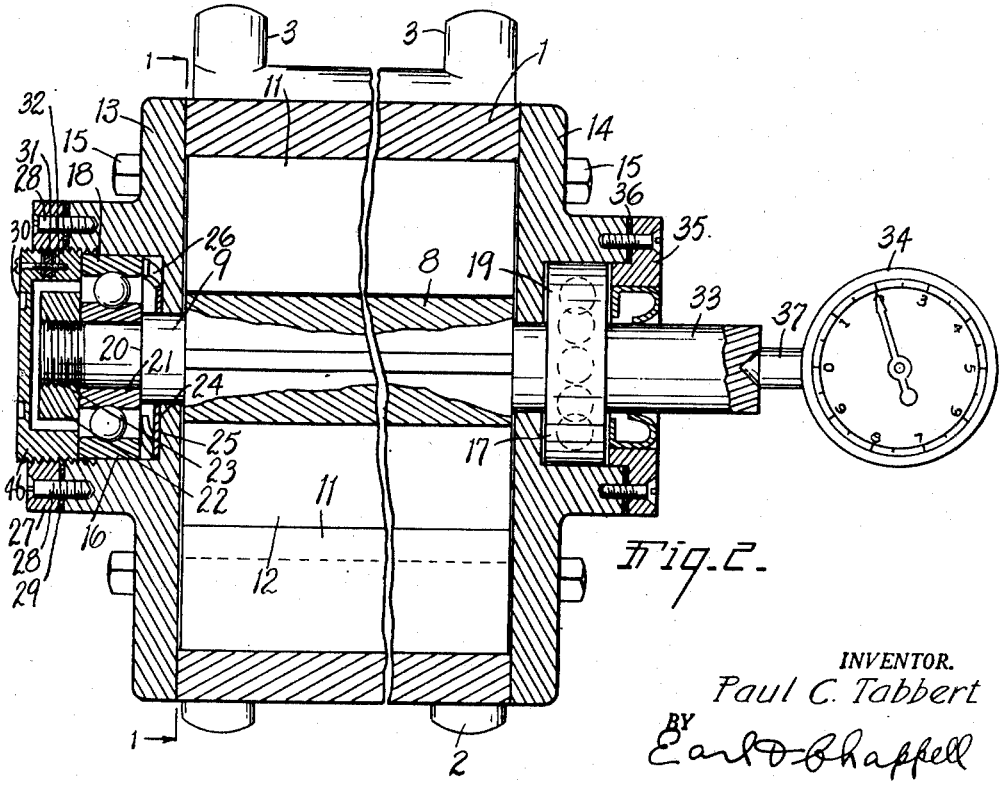
INVENTOR.
Paul C. Tabbert
BY
Earl D. Chappell
ATTORNEYS.

Patented Feb. 6, 1951

2,540,767

UNITED STATES PATENT OFFICE 2,540,767

ROTARY PUMP

Paul C. Tabbert, Bridgman, Mich.

Application June 29, 1945, Serial No. 602,274

7 Claims. (Cl. 308—189)

This invention relates to improvements in rotary pumps.

In the assembling of the rotary type vacuum or pressure pumps it is highly important that the rotor be perfectly alined as well as having equal clearance between the ends of the rotor and the end plates or heads of the pumps.

The main objects of this invention are:

First, to provide a structure in which this adjustment or positioning of the rotor may be quickly and accurately done.

Second, to provide a structure having these advantages which is compact and simple in its parts.

Third, to provide a structure in which the rotor shaft bearings are quickly and easily applied.

Further objects pertaining to details and economies of the invention will definitely appear from the description to follow. The invention is defined in the claims.

A structure which embodies the features of the invention is clearly illustrated in the accompanying drawing, in which:

Fig. 1 is a fragmentary end elevation with the left hand head or end plate as viewed in Fig. 2 removed and sectioned on line 1—1 of Fig. 2.

Fig. 2 is an enlarged fragmentary view mainly in section on line 2—2 of Fig. 1.

Fig. 3 is a side elevation of a device which may be used to facilitate the adjustment and positioning of the rotor.

In the embodiment of my invention illustrated the cylinder body 1 is provided with radial post-like enlargements 2, 2 and 3, 3 angularly spaced to be secured to the supporting brackets 4 on the bed or other supporting surface 5, the purpose being to permit the supporting of the pump in various positions. This is a feature of my application for Letters Patent filed March 14, 1945, Serial No. 582,741, now Patent No. 2,469,936, issued May 10, 1949. The ports 6 and 7 may be connected as desired, depending on whether the pump is to be used as a vacuum pump or a pressure pump.

The rotor 8 is provided with a shaft disposed eccentrically relative to the pump chamber 10. The vanes or blades 11 are supported in the radial slots 12 to coact with the wall of the cylinder. The cylinder body 2 is provided with heads or end plates 13 and 14 removably secured to the body by the bolts 15. These end plates are provided with outwardly facing bearing chambers or boxes 16 and 17 adapted to slidably receive the bearing assemblies 18 and 19. The bearing assemblies illustrated are of the ball type consisting of inner and outer race ways with interposed balls, the outer race way slidably fitting within the bearing boxes. It will be understood that they should be a close fit such as to permit axial movement of the bearing within the boxes for adjusting and assembling pumps as will be described.

The rotor shaft 9 is provided with an outwardly facing shoulder 20 at one end against which the inner race member 21 of the bearing 18 abuts. This race member is clamped against the shoulder by means of the nut 22 threaded upon the threaded end 23 of the shaft. The spring washer or thrust member 24 is arranged in the bearing box in supported engagement with the inner end wall 25 thereof. This spring thrust member is provided with spring fingers 26 engaging the bearing. As the bearing is axially fixed to the shaft the spring acts to thrust the rotor toward the left in the assembly illustrated and against the inner side of the head plate.

The bearing box 18 is internally threaded to receive the cap 46 which abuts the outer raceway of the bearing so that by adjustment of the cap the bearing 19 may be moved inwardly in the box and thus move the rotor to the right.

In this embodiment I provide a securing or locking ring 27 which is threaded upon the cap and secured in its adjusted position by means of the screws 28, a gasket 29 being interposed between the end of the box and the ring to insure an effective gripping action of the threads of the ring with the cap or bearing adjusting member. This is in the form of a cap in the embodiment illustrated but it will be understood that it could be otherwise shaped. It is provided with recesses 30 adapted to receive an adjusting tool.

As a further locking means I provide a clutch dog 31 secured in a peripheral recess in the cap by means of the screws 32 and adapted to engage the threads of the retaining ring 27. The opposite end of the shaft projects at 33 to receive a driving pulley and also to permit its association with an indicator 34 to facilitate adjustment.

The bearing 19 is of the roller type and the inner raceway member is desirably a pressed fit on the shaft, the outer member being a close but axially sliding fit with the box 17. The box 17 is closed by the gland member 35 and packing 36.

In assembling and adjusting the rotor the shouldered end of the shaft is inserted in the cylinder head or end plate 13, the spring 24 inserted, and the bearing assembly is then placed on the shaft against the shoulder and secured by the nut 22. The spring element presses the rotor to the cylinder head, alining it perpendicularly to the surface of the head. With the parts thus assembled the head plate is bolted to the cylinder body. The head 14 is then placed on the other end of the shaft with the bearing 19 pressed upon the shaft, and in that position the bearing and shaft are free to move in either direction relative to the head plate 14. The head plate is then bolted to the housing. This completes the rotor assembly with the exception that the clearance between the rotor and end plate is to be equalized or the rotor is to be adjusted to secure the proper end clearance. The cap 30 is then assembled and adjusted to position the bearing 18, and consequently the shaft and rotor, to provide the desired clearance. I prefer the screw adjustment illustrated as it provides for very easy and accurate adjustment. The adjusting parts should be locked in adjusted position and I have provided means to that end. Other forms of adjusting means may be provided with satisfactory results.

To facilitate adjustment I preferably make the adjustment against the spindle 37 of the indicator 34. This may be accomplished by means of an assembling or testing unit comprising a base 38 on which the indicator 34 is mounted, the base being adapted to receive the supporting brackets 4.

I have illustrated and described my invention in an embodiment which is highly practical commercially. I have not attempted to illustrate or describe other adaptations of the invention which I contemplate as it is believed this disclosure will enable those skilled in the art to embody my invention as may be desired.

Having thus described my invention what I claim as new and desire to secure by Letters Patent is:

1. In a rotary pump, the combination with a cylinder body, of a removable head for one end of said body provided with an outwardly opening bearing box internally threaded at its outer end, a rotor provided with a shaft projecting into said bearing box and threaded at its outer end and having an outwardly facing shoulder spaced from the end wall of the bearing box, a bearing arranged on said shaft in abutting relation to said shoulder thereon, a nut clamping said bearing upon said shoulder, said bearing being axially slidable within said bearing box, a spring washer arranged on said shaft at the inner end of said bearing in thrust engagement with the bearing and in supported engagement with the end wall of said bearing box and acting to urge the shaft axially, a cap threaded into said bearing box for adjusting the bearing axially therein and through it said rotor, means for locking said cap in its adjusted position, said shaft terminating inwardly of said cap, said cap constituting a closure means for the outer end of the bearing box to prevent the escape of fluid from said outer end, a second cylinder head provided with an outwardly opening bearing box, a second bearing having a pressed fit on the other end of said rotor shaft and axially slidable within said second bearing box, and a closure for said second bearing box through which the end of said rotor shaft is exposed whereby an indicator may be associated therewith to facilitate the positioning of the rotor between the cylinder heads in spaced clearance relation thereto, said exposed end of the shaft constituting a drive end of the shaft.

2. In a rotary pump, the combination with a cylinder body, of a removable head for one end of said body provided with an outwardly opening bearing box internally threaded at its outer end, a rotor provided with a shaft projecting into said bearing box and threaded at its outer end and having an outwardly facing shoulder spaced from the end wall of the bearing box, a bearing arranged on said shaft in abutting relation to said shoulder thereon, a nut clamping said bearing upon said shoulder, said bearing being axially slidable within said bearing box, a spring washer arranged on said shaft at the inner end of said bearing in thrust engagement with the bearing and in supported engagement with the end wall of said bearing box and acting to urge the shaft axially, a cap threaded into said bearing box for adjusting the bearing axially therein and through it said rotor, means for locking said cap in its adjusted position, said shaft terminating inwardly of said cap, said cap constituting a closure means for the outer end of the bearing box to prevent the escape of fluid from said outer end, a second cylinder head provided with an outwardly opening bearing box, and a second bearing having a pressed fit on the other end of said rotor shaft and axially slidable within said second bearing box, said other end constituting a drive end of the shaft.

3. In a rotary pump, the combination with a cylinder body, of a removable head for one end of said body provided with an outwardly opening bearing box, a rotor provided with a shaft projecting into said bearing box, a bearing fixedly mounted on said shaft and axially slidable within said bearing box, a washer arranged around said shaft at the inner end of said bearing and having spring fingers in thrust engagement with the bearing, said washer being in supported engagement with the end wall of said bearing box and acting to urge the shaft axially, means for adjusting said bearing axially, said means including a closure cap at the outer end of the bearing box to prevent escape of fluid from said outer end, a second cylinder head provided with an outwardly opening bearing box, a second bearing fixed to the other end of said rotor shaft and axially slidable within said second bearing box, and a closure for said second bearing box through which the end of said rotor shaft is exposed whereby an indicator may be associated therewith to facilitate the positioning of the rotor between the cylinder heads in spaced clearance relation thereto, said exposed end of the shaft constituting a drive end of the shaft.

4. In a rotary pump, the combination with a cylinder body, of a removable head for one end of said body provided with an outwardly opening bearing box, a rotor provided with a shaft projecting into said bearing box, a bearing fixedly mounted on said shaft and axially slidable within said bearing box, a washer arranged around said shaft at the inner end of said bearing and having spring fingers in thrust engagement with the bearing, said washer being in supported engagement with the end wall of said bearing box and acting to urge the shaft axially, means for adjusting said bearing axially, said means including a closure cap at the outer end of the bearing box to prevent escape of fluid from said outer end, a second cylinder head provided with an outwardly opening bearing box, and a second bearing fixed to the other end of said rotor shaft and axially slidable within said second bearing box, said other end constituting a drive end of the shaft.

5. In a rotary pump, the combination with a cylinder body, of a cylinder head provided with an open ended bearing box, a rotor provided with a shaft, a bearing axially fixed to said shaft and axially slidable within said bearing box, means arranged within said bearing box for yieldingly biasing the bearing axially in one direction, a cap for said bearing box constituting an adjusting means for said bearing in opposed relation to its biasing means, means for locking said cap in its adjusted position, said cap constituting a closure means for the outer end of the bearing box to prevent the escape of fluid therefrom, a second cylinder head provided with an outwardly opening bearing box, and a second bearing axially fixed to the other end of said rotor shaft and axially slidable within said second bearing box, the end of the shaft being exposed to permit the association therewith of an indicator to facilitate the positioning of the rotor between the cylinder heads in spaced clearance relation thereto.

6. In a rotary pump, the combination with a cylinder body, of a cylinder head provided with an open ended bearing box, a rotor provided with a shaft, a bearing axially fixed to said shaft and axially slidable within said bearing box, generally flat cupped spring means arranged within said bearing box and bearing against the end wall thereof for yieldingly biasing the bearing axially in one direction, a cap for said bearing box constituting an adjusting means for said bearing in opposed relation to its biasing means, and means for locking said cap in its adjusted position, said shaft terminating inwardly of said cap, said cap constituting a closure means for the outer end of the bearing box to prevent the escape of fluid therefrom.

7. In combination a cylinder body, cylinder heads at opposite ends of said cylinder body, one of said cylinder heads having an outwardly opening bearing box, a rotor mounted in said cylinder body, a shaft on which said rotor is fixedly secured, a bearing axially fixed to said shaft adjacent one end thereof and axially slidable in said bearing box, means arranged within said bearing box for yieldingly biasing the bearing axially toward the open end of the bearing box, a cap for said bearing box disposed to adjust said bearing in opposed relation to said biasing means, means for axially adjusting said cap, said end of the shaft terminating inwardly of said cap, said cap constituting a closure means for the open end of the bearing box to prevent the escape of fluid therefrom, the other end of the shaft being rotatably and axially slidably supported by the opposed cylinder head and exposed externally of said opposed cylinder head to transmit power either to or from said end.

PAUL C. TABBERT.

REFERENCES CITED

The following references are of record in the file of this patent:

UNITED STATES PATENTS

| Number | Name | Date |
|---|---|---|
| 1,758,667 | Hughes | May 13, 1930 |
| 2,227,697 | Blood | Jan. 7, 1941 |
| 2,337,403 | Myers | Dec. 21, 1943 |

FOREIGN PATENTS

| Number | Country | Date |
|---|---|---|
| 78,583 | Switzerland | Mar. 18, 1918 |